April 12, 1927.
J. V. M. RISBERG
1,624,117
SELF ADJUSTING CENTRIFUGAL BOWL
Filed Oct. 26, 1921
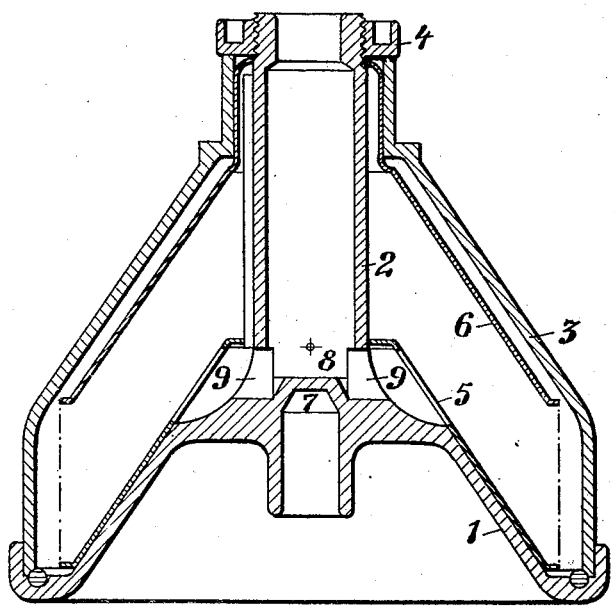
Inventor
J. V. M. Risberg,
By Marks&Clerk
Attys.

Patented Apr. 12, 1927.

1,624,117

UNITED STATES PATENT OFFICE.

JOHANNES VALDEMAR MÅRTEN RISBERG, OF SODERTELJE, SWEDEN, ASSIGNOR TO AKTIEBOLAGET BALTIC, OF STOCKHOLM, SWEDEN, A CORPORATION OF SWEDEN.

SELF-ADJUSTING CENTRIFUGAL BOWL.

Application filed October 26, 1921, Serial No. 510,648, and in Sweden January 15, 1920.

In centrifugal liquid separators of older construction the driving spindle generally is firmly connected with the bowl. However, it proved suitable to connect the bowl with the spindle in a detachable manner in order to facilitate the cleaning of the same. For that reason the bowl was provided in its lower part with a recess, so that it was possible to slide the bowl on the spindle. Owing to the fact that the bowls at that time were not self-adjusting, it was necessary to extend the spindle upwards in the bowl for such a distance, that the centre of gravity of the bowl was located below the top end of the spindle, because otherwise there was the risk of the flinging away from the spindle of a badly balanced bowl during its rotation. When, afterwards, the manufacturers passed over to so called self-adjusting bowls, which are freely suspended on the top end of the spindle, the said arrangement of the spindle was maintained i. e. it is still extended upwards to a point, located above the centre of gravity of the bowl, which has resulted in the necessity of introducing the milk from the centretube of the bowl to the lower inner edge of the set of skimming or a-discs either through a special milk distributor, provided between the centretube and the inner edges of the skimming discs, or through comparatively long and curved channels provided in the bottom wall of the bowl. An advantageous feature of the said self-adjusting separator bowl, however, consists in the tendency of the bowl to rotate round its symmetrical axis, caused by the relation between the moment of inertia of the bowl in respect of the said axis and the moment of inertia of the bowl in respect of an axis which is perpendicular to the axis, first mentioned, and passes through the centre of gravity of the bowl.

The present invention has in view to profit by the said self-adjusting property of the bowl by locating the suspension point i. e. the top end of the driving spindle of such self-adjusting bowls at a considerable lower level than has been usual hitherto. This enables the introducing of the milk from the centretube into the space below the lowermost a-disc through comparatively wide and straight openings provided in the centretube, near the bottom wall of the bowl. The self-adjusting bowl is characterized, as stated above, by the tendency of the bowl to maintain its rotary motion round the symmetrical axis of the bowl. In fact, the said tendency has proved independent of the level of the suspension point of the bowl with relation to the centre point of the bowl, however, the said suspension point, evidently, may not be located at a greater distance from the centre of gravity than is necessary for the said easy communication for the introducing of the milk to the skimming discs. Besides, the guide of the bowl effected by the spindle, in which a certain play must be provided, must be so long, that the oscillations of the bowl during the starting of the same and before the velocity of the bowl has become sufficient, are limited.

A separator bowl arranged in accordance with this invention is shown in a vertiacl section on the accompanying drawing.

1 is the bottom wall of the bowl provided with the centretube 2. 3 is the bowl cover and 4 is the nut which is screwed on the centretube 2 and connects the parts. 5 and 6 is the bottom disc and the top disc respectively, the intermediate discs are not shown. The said discs are of the so called a-type. As perceived from the drawing the suspension point 7 of the bowl is located below the centre of gravity 8 of the bowl. Owing to the fact that the said suspension point is located at such a low level, the communication between the centretube 2, into which the milk is introduced, and the chamber below the bottom disc may consist of straight, wide openings or channels 9 provided in the centretube at the bottom wall, which in an essential degree facilitates the procuring and cleaning of same.

I claim:

A separator bowl freely suspended at the upper end of its driving spindle and provided with superposed a-disks, including a bottom having a central, downwardly extending socket closed at its upper end, the end wall of said socket constituting the suspension point of the bowl, and a central inlet tube, the bottom of which is formed by the end wall of said socket, said end wall being located below the inner edge of the bottom disk, said central tube being provided with openings communicating directly with the space between the bottom wall of the drum and the bottom disk and located substantially in the plane of said end wall.

In testimony whereof I have affixed my signature.

JOHANNES VALDEMAR MÅRTEN RISBERG.